United States Patent [19]

Kehoe

[11] 3,976,104

[45] Aug. 24, 1976

[54] COMPLETELY, DRAINING, NONLEAKING PNEUMATIC VALVE

[75] Inventor: Thomas J. Kehoe, Fullerton, Calif.

[73] Assignee: Beckman Instruments, Inc., Fullerton, Calif.

[22] Filed: Sept. 27, 1973

[21] Appl. No.: 401,162

[52] U.S. Cl. ............................... 137/806; 137/13; 137/824; 259/4 R; 137/154
[51] Int. Cl.² ............................................ F15D 1/02
[58] Field of Search .......... 137/806, 823, 824, 154, 137/13, 251, 804; 261/121 R

[56] References Cited
UNITED STATES PATENTS

| | | | |
|---|---|---|---|
| 3,152,117 | 10/1964 | Eijsberg et al. | 137/13 X |
| 3,186,808 | 6/1965 | Anscherlik | 137/602 X |
| 3,425,433 | 2/1969 | Moore | 137/251 X |
| 3,695,281 | 10/1972 | Leon | 137/154 X |
| 3,738,620 | 6/1973 | Ennis | 261/121 R |
| 3,837,540 | 9/1974 | Wagener | 137/804 |

*Primary Examiner*—William R. Cline
*Attorney, Agent, or Firm*—R. J. Steinmeyer; P. R. Harder

[57] ABSTRACT

A valve system is provided for completely draining a vessel which may contain corrosive liquids and for preventing leakage until the vessel is to be drained. This is accomplished by providing the vessel with a throat at the bottom, an outlet tube connected to the throat and a pressure tube connected to the outlet tube with a source of fluid or gas pressure connected to the outlet tube between the throat and the pressure tube to force gas upward against (and/or through) the throat, thereby preventing the flow of liquid downwad through the throat. Agitation of the vessel contents can be achieved by flow of gas through he throat. The pressure tube is arranged to produce a positive pressure head greater than or equal to the maximum expected height of liquid in the vessel so that the pressure of air or inert gas upward prevents any liquid from draining from the throat of the vessel until the air or gas pressure is turned off, at which time complete drainage of the vessel takes place because of the absence of any chambers or cavities such as may be present in a conventional mechanical type valve.

7 Claims, 6 Drawing Figures

3,976,104

1

COMPLETELY, DRAINING, NONLEAKING PNEUMATIC VALVE

BACKGROUND

When liquids are to be mixed and analyzed by colorimetric or other methods or processes, mixing vessels are provided and they must be periodically drained into the analyzer or otnerwise discharged. When such vessels or other vessels are drained, the typical procedure is to equip the vessels with a lowest elevation drain outlet and a valve or plug for either retaining the contents or permitting drainage of the contents.

In some cases the means for closing off the drain outlet results in leakage of fluid when closed. On the other hand, the design of the plug or valve may be such that some fluid is retained when all of the contents should be drained. When corrosive materials are to be handled or liquids which are highly reactive chemically, the choice of materials of construction of customary mechanical valves that will withstand such liquids is highly limited and such materials are also expensive.

There has been a need for an inexpensive, nonleaking drainage device for a mixing chamber or vessel, particularly such as required in an automated wet chemical analyzer which may receive any number of potentially corrosive chemical reagents. There is also a need following the addition of the reagents to the vessel for the contents to be mixed by air agitation and then drained into a suitable analyzer such as a colorimeter. There is a need also for a valve of general application or for specialized applications in the process industries. A valve without moving parts is desirable for hazardous environments, for air or inert gas injection in sterile solutions such as in the pharmaceutical industry, and use with slurries of fibrous materials wherein the usual valve seating of mechanical valves can be a problem.

Solenoid actuated mechanical valves composed of materials such as polytetrafluoroethylene have been considered but the cost of this approach has been considered prohibitive. Other designs have been proposed, such as air operated conical plug valves followed by a solenoid operated one of similar design. However, alignment problems have resulted in erratic leakage and breakage of the shafts of such valves.

Accordingly, an object of the invention is to eliminate mechanical problems and materially reduce cost and complexity of existing and proposed drainage valves and also to provide means for mixing by air agitation. Inert gases may be used instead of air when an inert gas blanket is desirable.

SUMMARY OF THE INVENTION

In carrying out the invention in accordance with the preferred form thereof, a mixing vessel is provided with a drain tube having a side arm to which a source of fluid such as gas under pressure is connected for blowing fluid into the vessel upward through the drain tube to block the drainage of liquid through the drain tube as well as producing air agitation. To prevent excessive flow of air or inert fluid outward through the drain tube, a pressure tube is connected to the drain tube below the side arm. The pressure tube is arranged to produce a greater back pressure than that corresponding to the pressure head of the liquid in the mixing vessel. Air or inert gas flows into the mixing vessel through the throat at its bottom and the drainage of liquid from the vessel is prevented until the air pressure is turned off. The pressure tube may in one form of the invention consist of a tube of smaller diameter than the drain tube so that the requisite back pressure is produced across it at a moderate flow rate. Alternatively, the pressure tube may form a component of a liquid column pressure regulator producing the requisite back pressure.

A better understanding of the invention will be afforded by the following detailed description considered in conjunction with the accompanying drawing.

DRAWINGS

In the drawings.

Like reference characters are utilized throughout the drawing to designate like parts.

DETAILED DESCRIPTION

Figure 1:
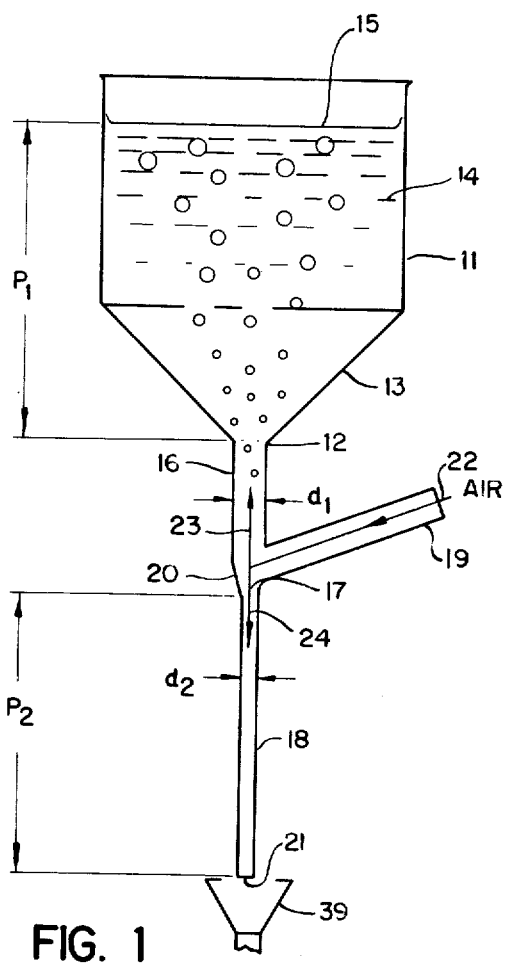
FIG. 1 is a schematic diagram of an embodiment of the invention employing a small diameter outlet tube for producing back pressure exceeding static head in the mixing vessel.

In the embodiment illustrated in FIG. 1 there is a mixing vessel 11, having a throat 12 at the lower end, which preferably slopes inward along a conical surface 13 so that all of the contents of the vessel 11 will drain through the throat 12 when the vessel 11 is to be emptied. The vessel 11 is filled with a liquid 14 up to a level 15 which, for the sake of illustration, will be assumed to be the maximum level for which the vessel 11 is designed.

An outlet tube 16 is provided which is preferably vertical and which extends from the throat 12 to an outlet 17 at the lower end of the tube 16 in the case of the embodiment of FIG. 1. A pressure tube 18 is connected to the outlet 17 and a pressure fluid supply tube 19 is connected to the outlet tube 16 at a point between the throat 12 and the outlet 17. The fluid under pressure may be air, an inert gas or a suitable liquid. The pressure supply tube 19 preferably slopes downward at a suitable angle such as 30° to 45° so that the liquid 14 does not enter this arm to any extent as it flows downward. Although the arm 19 may receive air under pressure when there is no need to avoid air oxidation of liquids being mixed, when oxidation is to be avoided the tube 19 is connected to a suitable source of inert fluid such as a tank of nitrogen under pressure.

In the embodiment of FIG. 1 the air or fluid supply tube 19 is connected to the lower end of the outlet tube 16 at the junction to the pressure tube 18 and the pressure tube 18 is open at the bottom 21 so that liquid 14 may be drained from the lower open end 21 when the air supply through the tube 19 is cut off. In the embodiment of FIG. 1, also, the outlet tube 16 has a diameter $d_1$ greater than the diameter $d_2$ of the pressure tube 18. The outlet tube 16 tapers to the diameter of the pressure tube 18 in a section 20 across the width of the air supply tube 19 at the junction therewith. The diameter $d_2$ of the pressure tube 18 is chosen to be small enough so that the back pressure $P_2$ due to a modest flow of gas through tube 18 is sufficient to exceed the pressure head $P_1$ represented by the difference in level between the throat 12 and the upper level 15 of the liquid 14 in the vessel 11. This causes air to flow upward through the throat 12 and the liquid 14, providing desirable agitation of the liquid 14 and preventing liquid 14 from draining from the vessel 13.

Thus, the air from the air supply flows through the air supply tube 19 in the direction of the arrow 22 to the lower end of the outlet tube 16 at its junction with the pressure tube 18 at the outlet 17. A portion of the air or inert gas also flows upward in the direction of the arrow 23 bubbling through the liquid 14 to agitate the liquid 14 and promote mixing of the constituents thereof. A second portion of the air or inert gas escapes downward in the direction of the arrow 24 through the pressure tube 18 to develop the requisite back pressure for preventing drainage of liquid 14.

Figure 2:
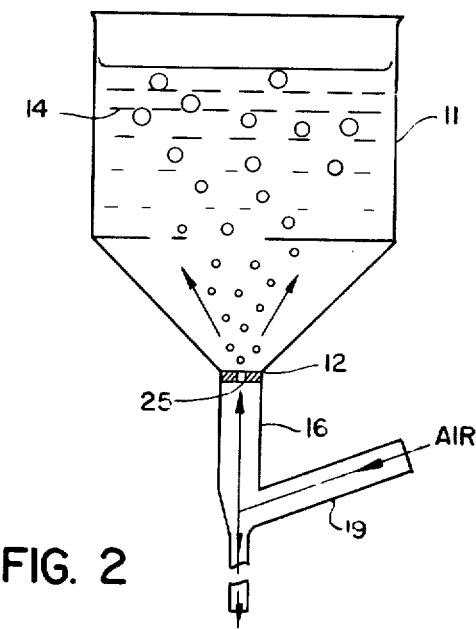
FIG. 2 is a diagram of a modified embodiment in which an orifice is provided in an outlet throat of the mixing vessel to reduce the tendency of liquid to trickle past the flow of drainage-blocking air as a thin film on the surface of the throat.

Precautions are taken to avoid making the outlet tube 16 so excessively large that liquid may drip downward along the outer walls notwithstanding the air pressure in the tube 16. Such wall leakage may be avoided by restricting the upper end of the outlet tube 16. This may be done, for example, as illustrated in FIG. 2 by providing an orifice 25 at the throat 12. It is also necessary to avoid having the diameter of the outlet tube 16 or of the orifice 25 so small as to constitute a capillary which might become clogged by particulates in the fluid 14. Restriction of the upper end of the outlet tube 16 may also be accomplished in the manner illustrated in FIG. 3 wherein the vessel 11 is provided with a smaller diameter throat 26 and the outlet tube 16 tapers in the upward direction at its upward portion 27 to the smaller diameter of the throat 26.

The invention is not limited to use of fluid in gaseous form as the tube 19 may also be used to supply a liquid of either higher or lower density than the liquid 14 instead of gas. Useful extractions may be done in this way. It will be understood that fluids of suitable wetting properties would be employed.

When it is desired to produce not merely mixing of the liquid 14, but in addition to mixing or instead thereof, a controlled reaction, the fluid introduced through the tube 19 is a suitable reagent. Fluids in gaseous, dissolved or liquid form may be employed both to serve as a valve and to control a reaction. Such reagents, e.g., as NO, $NO_2$, $H_2S$, $SO_2$, $CO_2$, $NH_3$, HCl, $Cl_2$ and $O_2$ may be employed.

Figure 4:
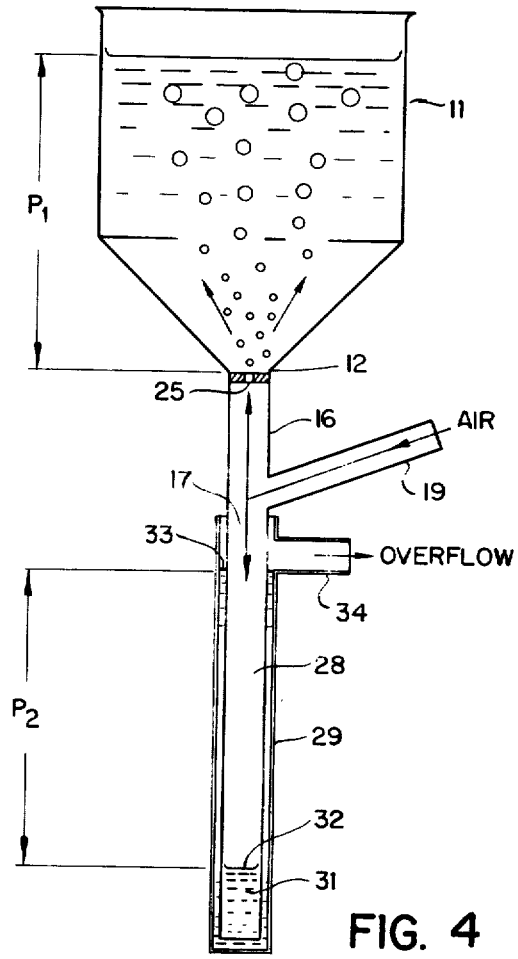
FIG. 4 is a diagram of another embodiment of the invention in which a liquid column is provided for producing the requisite back pressure either with or without outflow of air through the outlet tube.

The invention is not restricted to the use of a small diameter pressure tube in which the effect of friction of the flowing air is relied upon to produce the requisite back pressure to overcome the liquid head of the vessel. For example, as illustrated in the embodiment of FIG. 4, static pressure may be provided for this purpose. There is a pressure tube 28 extending downward from the outlet 17 of the outlet tube 16 into an outer liquid column tube 29 containing a liquid 31 having a level 32 within the tube 28 and a level 33 within the outer tube 29 when air is flowing into the tube 19 so that the difference between the levels 32 and 33 representing a pressure head of $P_2$ exceeds or equals the pressure head $P_1$ in the vessel 11. As illustrated in FIG. 4, no gas will escape through the tube 28 unless an excess of gas flow exists.

In the embodiment of FIG. 4 the inlet from the air supply tube 19 to the outlet tube 16 is above the outlet 17 but below the throat 12 of the vessel 11 and an overflow tube 34 is provided for delivering the drainage from the vessel 11 when the air supply is turned off in the air supply tube 19.

In the embodiment of FIG. 4 the pressure of the inert gas or air supplied through the air supply tube 19 will cause the level 33 to rise until it reaches the level of the overflow pipe 34 and the level 32 to fall until the pressure head difference $P_2$ equals the sum of the pressure head $P_1$ in the vessel 11 and the pressure drop due to flow up outlet tube 16 through orifice 25.

After each mixing of liquid in the vessel 11 and drainage therefrom, the liquid 14 will drop into the tube 28 and the excess will overflow through the overflow tube 34 for analysis.

Figure 5:
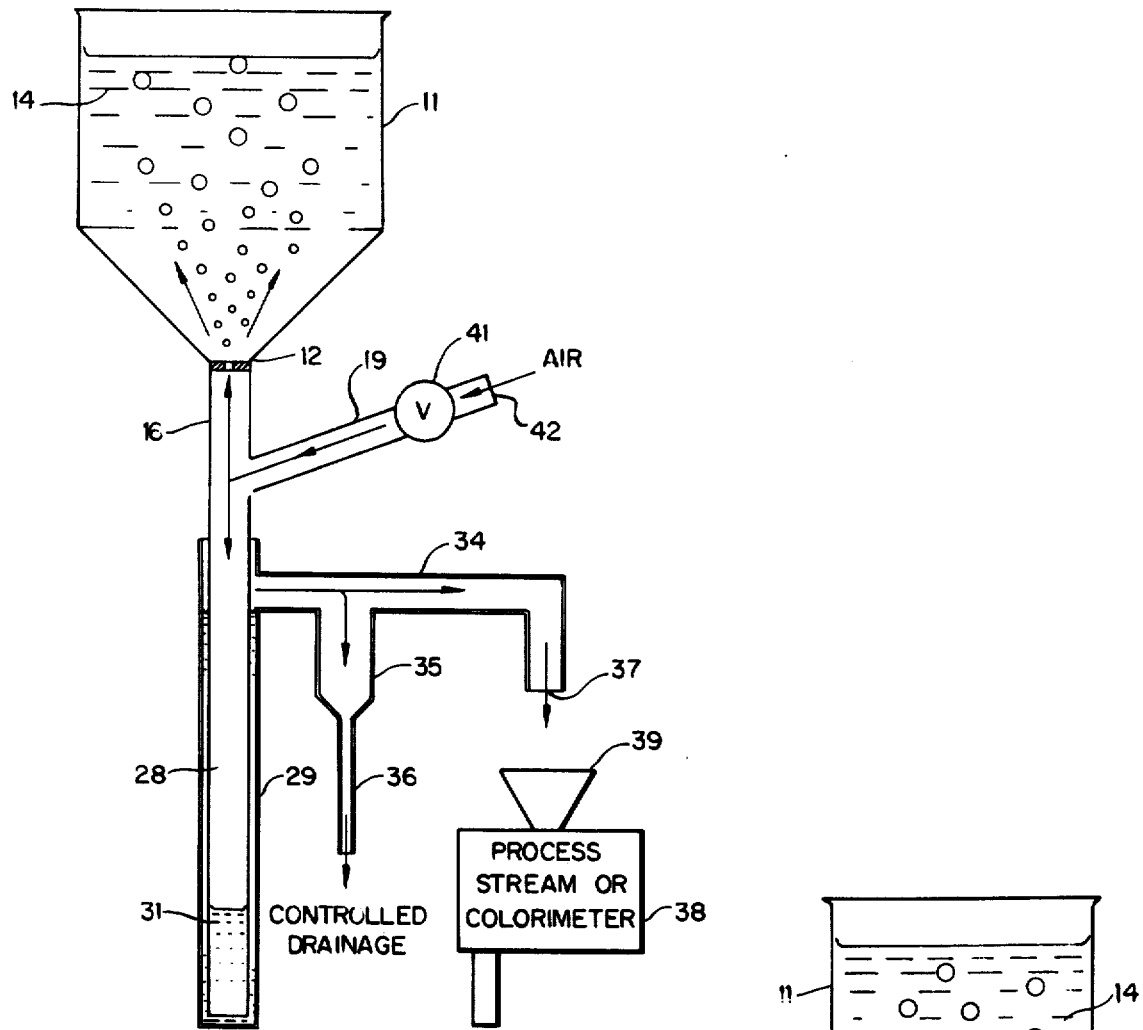
FIG. 5 is a diagram of a modification of the embodiment of FIG. 4 in which a trap is provided to assist in separating the fresh sample from the liquid column left by the previous sample, and in which an arrangement of apparatus for discharging drained liquid into an analysis apparatus such as a colorimeter is illustrated.

In order to reduce contamination of liquid drained from the vessel 11 by liquid left in the pressure tube from the previous analysis, a trap 35 may be provided as illustrated in FIG. 5. The trap 35 is connected to the overflow tube 34 and extends downward. At the lower end of the trap 35 a controlled drainage tube 36 is provided having a sufficiently small diameter to retard the discharge of fluid through the trap 35, causing most of the contents of the vessel 11 to be delivered from an outlet 37 to a process stream or to an analyzer such as a colorimeter 38 having an inlet 39 below the overflow tube outlet 37. The controlled drainage tube 36 has a relatively small diameter in comparison with the liquid flow tube 34 and may constitute a capillary tube. Tube 36 is sized to assure complete drainage of trap 35 between successive analyses. Suitable means such as a valve 41 are provided for turning off or on the supply of air to the air supply tube 19 from an air pressure source 42.

When the valve 41 is closed to cut off the supply of air or inert gas under pressure through the tube 19, liquid 14 drains from the vessel 11 into the pressure tube 28, forcing out the liquid leg 31 in the tubes 28 and 29. The initially displaced liquid flows into the trap 35, rather than to the colorimeter 38 through outlet 37. With proper sizing of throat 12, and of the pressure and various outlet tubes, the liquid leg 31 remaining from the previous analysis is displaced by essentially plug flow, with minor intermixing with the fresh sample 14. Trap 35 is preferably sized to have a volume slightly greater than that of the liquid leg 31. Once the trap 35 is filled by the quantity of old sample being displaced from the liquid leg, the "fresh" liquid 14 flows past the trap 35 to its destination through the tube 34, outlet 37 and to the inlet 39 of the colorimeter 38. In order to prepare for the next drain cycle, the trapped fluid in the trap 35 is allowed to drain slowly from the trap 35 through the controlled flow outlet or capillary 36.

It will be understood that in the arrangements of FIGS. 4 and 5 a somewhat greater quantity of reagent is mixed in the vessel 11 than will be required for analysis in the colorimeter 38 inasmuch as some of the liquid will be required for providing the liquid leg 31 for the subsequent analysis cycle. Nevertheless, no leakage of liquid takes place from the vessel 11 during the mixing process to alter the relative proportions of the constituents of the batch of liquid to be analyzed and the liquid 14 is retained in the vessel 11 indefinitely without leakage so long as the valve 41 is open. However, when the valve 41 is closed to cut off air supply through the tube 19, the vessel 11 and the outlet tube 16 will be completely drained.

Figure 3:
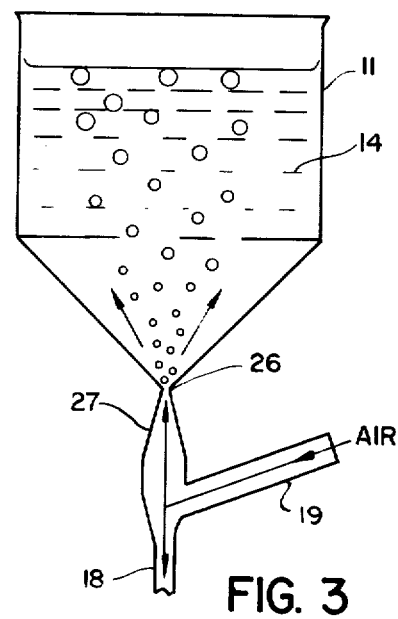
FIG. 3 is a diagram of a modification in the arrangement of FIG. 2 in which the drain tube is tapered toward the outlet throat of the mixing vessel.

On the other hand, if it is desired to save the entire body of liquid 14 in the vessel 11 for analysis, the embodiments of FIGS. 1, 2 or 3 are employed in which leakage of any liquid from the throat 12 of the vessel 11 is prevented while the valve 41 is open and the entire body of liquid 14 is drained through the outlet tube 16 and the pressure tube 18 into the analyzer inlet 39 when the valve 41 is closed to cut off the supply of air pressure through the tube 19.

Figure 6:
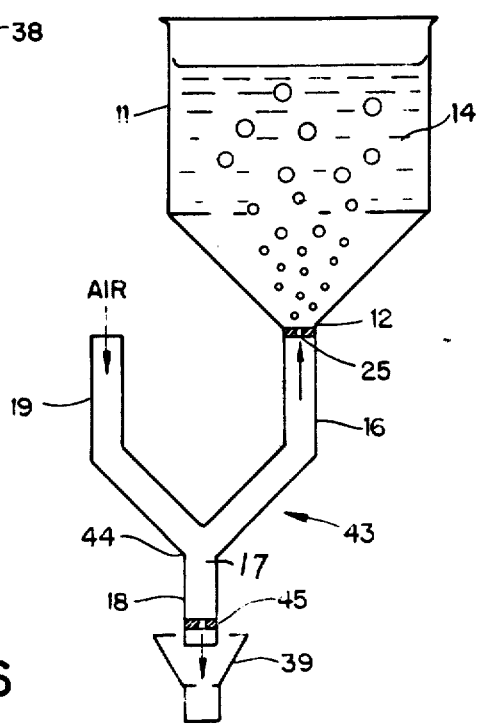
FIG. 6 is a diagram of still another embodiment of the invention in which orifices are provided in the back pressure tube as well as in the outlet throat of the mixing vessel.

In accordance with another embodiment illustrated in FIG. 6 the invention may be carried out by utilizing a plastic Y fitting 43 mounted with two upwardly extending arms 16 and 19 to form the outlet tube and the fluid pressure supply tube, respectively, of a fluid pressure control valve and by utilizing the downwardly extending arm of the Y as the pressure tube 18. Thus, the Y junction 44 provides a connection to the outlet tube 16 and the pressure tube 18 at the outlet 17 of the outlet tube 16. The pressure tube leg 18 of the Y fitting 43 may be of smaller diameter than the outlet tube 16 in order to provide the requisite pressure. However, this is not necessary as a constriction 45 may be provided in the pressure tube 18.

In the embodiment of the invention illustrated in FIG. 6 the constrictions 25 and 45 may take the form of plastic discs. The throat disc 25 is drilled with an optimum-diameter hole through which the air flows. The pressure tube constriction disc 45 is drilled with a slightly smaller-diameter hole so that the greater restriction provides suitable pressure drop to force the flow of air upward and through the liquid head.

While certain embodiments of the invention have been fully illustrated and described, it will be obvious to those skilled in the art that various modifications and alterations may be made therein and it is intended to cover all such modifications and alterations as may fall within the spirit and scope of the invention.

What is claimed is:

1. A fluid operated valve for interrupting the transfer of liquid by gravity from the outlet of a vessel into a receptacle comprising:
    a. a first conduit having a first end connected to the outlet of the vessel and a second end disposed to direct the liquid into the desired receptacle therefor;
    b. a second conduit connected to said first conduit between said first end and said second end, said second conduit being connected to an interruptable source of fluid under pressure equal to or greater than the pressure of the liquid in the vessel at the outlet of the vessel; and,
    c. means disposed between said connection of said second conduit into said first conduit and said second end of said first conduit for restricting the flow of said fluid through the portion of said first conduit between said connection and said second end whereby a portion of said fluid will be required to pass from said first conduit into the vessel through the outlet of the vessel at a pressure greater than the pressure of the liquid in the vessel at the outlet of the vessel and at a flow rate sufficient to prevent the liquid in the vessel from passing from the vessel into said first conduit.

2. The fluid operated valve of claim 1 wherein said means for restricting the flow of fluid in said first conduit comprises means for reducing the effective internal cross-sectional area of said first conduit.

3. The fluid operated valve of claim 1 wherein additionally, means are provided in said first conduit between the outlet of the vessel and the point of connection of said second conduit for restricting the effective size of said first conduit to assist in preventing the liquid from passing from the vessel through said first conduit when fluid under pressure is present in said first conduit while allowing liquid to flow from the vessel through said first conduit when no fluid under pressure is present.

4. The fluid operated valve of claim 1 wherein said second conduit is connected to said first conduit at an angle sufficient to prevent liquid from entering said second conduit from said first conduit when no fluid under pressure is present in said second conduit.

5. The fluid operated valve of claim 1 wherein said means for restricting the flow of fluid in said first conduit is a liquid static pressure apparatus wherein:
    a. a portion of said first conduit between said point of connection of said second conduit and said second end forms a pressure tube disposed substantially vertically downward; and,
    b. an outer liquid column tube being closed at the bottom and having said pressure tube inserted therein a distance at least equal to the intended maximum depth of liquid in the first vessel, said outer liquid column tube having an overflow pipe connected into said outer liquid column tube at a distance vertically from the end of said pressure tube inserted into said outer liquid column tube equal to the intended maximum depth of liquid in the vessel, the other end of said overflow pipe forming said second end of said first conduit to conduct liquid emerging therefrom into the receptacle.

6. The fluid operated valve of claim 5 wherein additionally, means for trapping a portion of the liquid passing through said overflow pipe is disposed in said overflow pipe between said point of connection into said outer liquid column tube and the end of said overflow pipe disposed adjacent said receptacle.

7. The fluid operated valve of claim 6 wherein additionally, said trap means has a small diameter drainage tube connected thereto to drain the trapped liquid over an extended period of time.

* * * * *